United States Patent
Abraham

(10) Patent No.: US 10,965,494 B2
(45) Date of Patent: Mar. 30, 2021

(54) INTELLIGENT MULTI-CHANNEL VPN ORCHESTRATION

(71) Applicant: International Business Machines Corporation, Armonk, NY (US)

(72) Inventor: Subil M. Abraham, Plano, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 816 days.

(21) Appl. No.: 14/872,441

(22) Filed: Oct. 1, 2015

(65) Prior Publication Data
US 2017/0099159 A1    Apr. 6, 2017

(51) Int. Cl.
| | | |
|---|---|---|
| G06F 15/16 | (2006.01) | |
| H04L 12/46 | (2006.01) | |
| H04L 12/26 | (2006.01) | |
| H04L 12/741 | (2013.01) | |
| H04L 29/06 | (2006.01) | |

(52) U.S. Cl.
CPC ...... *H04L 12/4641* (2013.01); *H04L 12/4633* (2013.01); *H04L 43/08* (2013.01); *H04L 45/54* (2013.01); *H04L 65/102* (2013.01); *H04L 65/80* (2013.01)

(58) Field of Classification Search
CPC ..... H04L 43/08; H04L 12/4641; H04L 45/54; H04L 67/02; H04L 65/102; H04L 65/80
USPC ........................................ 709/224, 217, 220
See application file for complete search history.

(56) References Cited

U.S. PATENT DOCUMENTS

| | | | |
|---|---|---|---|
| 7,469,294 B1 | 12/2008 | Luo | |
| 7,574,738 B2 | 8/2009 | Daude | |
| 8,260,922 B1* | 9/2012 | Aggarwal | H04L 45/24 709/226 |
| 8,301,738 B1* | 10/2012 | Alex | H04L 61/2038 709/220 |
| 8,443,435 B1* | 5/2013 | Schroeder | H04L 63/08 726/15 |
| 8,566,452 B1 | 10/2013 | Goodwin, III et al. | |

(Continued)

OTHER PUBLICATIONS

IBM: List of IMB Patents or Patent Applications Treated as Related, 2 pg.

(Continued)

*Primary Examiner* — David R Lazaro
*Assistant Examiner* — Mariegeorges A Henry
(74) *Attorney, Agent, or Firm* — Cuenot, Forsythe & Kim, LLC

(57) ABSTRACT

A respective VPN routing table for each of a plurality of VPNs can be stored on a client device. The client device can access a first VPN routing table and, using the first VPN routing table, establish a first VPN tunnel to a first VPN. The first VPN can be a first subnetwork assigned a particular network prefix. While the first VPN tunnel is currently active, the client device can access a second VPN routing table and, using the second VPN routing table, establish a second VPN tunnel to the second VPN. The second VPN can be a second subnetwork assigned the same particular network prefix as the first subnetwork. While the first VPN tunnel and the second VPN tunnel are simultaneously active, the client device can communicate data to remote devices in the first VPN and the second VPN using the particular network prefix for both.

21 Claims, 6 Drawing Sheets

(56) References Cited

U.S. PATENT DOCUMENTS

| | | | |
|---|---|---|---|
| 8,780,906 B2 | 7/2014 | Larson | |
| 8,855,012 B1 | 10/2014 | Suri | |
| 8,879,420 B2 | 11/2014 | Eichen et al. | |
| 2004/0146156 A1 | 7/2004 | Wellons | |
| 2006/0013209 A1* | 1/2006 | Somasundaram | H04L 12/4675 370/389 |
| 2009/0031415 A1* | 1/2009 | Aldridge | H04L 63/0272 726/15 |
| 2011/0154477 A1 | 6/2011 | Parla | |
| 2011/0202755 A1* | 8/2011 | Orsini | H04L 63/029 713/151 |
| 2012/0124660 A1 | 5/2012 | Wang | |
| 2013/0205025 A1* | 8/2013 | Shamsee | H04L 63/0272 709/225 |
| 2016/0014229 A1* | 1/2016 | Seedorf | H04L 47/2475 370/235 |
| 2017/0373968 A1* | 12/2017 | Li | H04L 41/0654 |
| 2018/0123829 A1 | 5/2018 | Abraham | |

OTHER PUBLICATIONS

Abraham, S.M., "Intelligent Multi-Channel VPN Orchestration," U.S. Appl. No. 15/853,698, filed Dec. 22, 2017, 41 pages.

\* cited by examiner

500

```
┌─────────────────────────────────────────────────────────────┐
│ Store on a client device a respective virtual private       │
│ network (VPN) routing table for each of a plurality of VPNs │
│                           502                               │
└─────────────────────────────────────────────────────────────┘
                              │
                              ▼
┌─────────────────────────────────────────────────────────────┐
│ Responsive to receiving a request to connect to a first VPN │
│ of the plurality of VPNs, access by the client device a     │
│ first VPN routing table and, using the first VPN routing    │
│ table, establish by the client device a first VPN tunnel    │
│ from the client device to the first VPN, wherein the first  │
│ VPN is a first subnetwork that is assigned a particular     │
│ network prefix                                              │
│                           504                               │
└─────────────────────────────────────────────────────────────┘
                              │
                              ▼
┌─────────────────────────────────────────────────────────────┐
│ While the first VPN tunnel is currently active, responsive  │
│ to receiving a request to connect to a second VPN of the    │
│ plurality of VPNs, access by the client device a second     │
│ VPN routing table and, using the second VPN routing table,  │
│ establish by the client device a second VPN tunnel from the │
│ client device to the second VPN, wherein the second VPN is  │
│ a second subnetwork that is assigned the same particular    │
│ network prefix as the first subnetwork                      │
│                           506                               │
└─────────────────────────────────────────────────────────────┘
                              │
                              ▼
┌─────────────────────────────────────────────────────────────┐
│ While the first VPN tunnel and the second VPN tunnel are    │
│ simultaneously active, communicate first data from the      │
│ client device to a first remote device in the first VPN     │
│ using the particular network prefix, and communicate second │
│ data from the client device to a second remote device in    │
│ the second VPN using the particular network prefix          │
│                           508                               │
└─────────────────────────────────────────────────────────────┘
```

FIG. 5

INTELLIGENT MULTI-CHANNEL VPN ORCHESTRATION

BACKGROUND

The present invention relates to communication networks, and more specifically, to virtual private networks.

A virtual private network (VPN) extends a private network across a public network, for example the Internet. Use of a VPN enables users to send and receive data across shared or public networks as if their processing devices were directly connected to a private network. Thus, using a VPN, users benefit from the functionality, security and management policies of the private network, though the users may be remotely located with respect to the systems/devices (e.g., a domain server) managing the private network. A VPN is created by establishing a point-to-point connection through the use of a VPN tunnel.

From a user perspective, extended network resources are accessed in the same way as resources available within the private network. This allows employees to securely access a corporate intranet while working outside the office. Similarly, VPNs can be used to securely connect geographically separated offices of an organization, creating a cohesive network. VPNs also can be used by individual Internet users to, among other things, secure wireless transactions.

Businesses have been leveraging Virtual Private Networks (VPN) for the past several years to enable their workforce to connect to enterprise resources over the public network. For example, an enterprise may provision a VPN gateway to provide secure access to the enterprise resources. However with the proliferation of multiple devices (laptop, tablet, smartphones, etc.) and the application ecosystem, it is necessary to enhance VPN capabilities in order to make the user's experience faster and more seamless. Indeed, today users are connecting to multiple VPN networks (work, home, school, etc.) from their devices and they tend to keep all those connections active in parallel on their system. There is no intelligent mechanism, however, to decide which VPN gateways to leverage in real time to handle traffic generated by the different applications residing on the user's device. Currently devices use a static routing table to decide where outbound traffic should be sent, which is inefficient.

U.S. Patent Publication No. 20130205025A1 discloses "[t]he first VPN gateway sends an indication of the second VPN gateway to the remote access client and maintains the first secure communication tunnel while the remote access client accesses the first resource of the enterprise network through a second secure communication tunnel established between the remote access client and the second VPN gateway" and "[e]ach VPN gateway may be operable to provide secure access to the same subset of a plurality of resources of the enterprise network." Thus, the selection of the second VPN gateway is performed by the first VPN gateway. Moreover, both VPN gateways merely provide access to the same subnet. Thus, using multiple gateways to access different subnets required to be accessed by different applications executing on a client device is not addressed, and solutions for enabling this to happen are not provided.

SUMMARY

A method includes storing on a client device a respective virtual private network (VPN) routing table for each of a plurality of VPNs. The method also includes, responsive to receiving a request to connect to a first VPN of the plurality of VPNs, accessing by the client device a first VPN routing table and, using the first VPN routing table, establishing by the client device a first VPN tunnel from the client device to the first VPN, wherein the first VPN is a first subnetwork that is assigned a particular network prefix. The method also includes, while the first VPN tunnel is currently active, responsive to receiving a request to connect to a second VPN of the plurality of VPNs, accessing by the client device a second VPN routing table and, using the second VPN routing table, establishing by the client device a second VPN tunnel from the client device to the second VPN, wherein the second VPN is a second subnetwork that is assigned the same particular network prefix as the first subnetwork. The method also includes, while the first VPN tunnel and the second VPN tunnel are simultaneously active, communicating first data from the client device to a first remote device in the first VPN using the particular network prefix, and communicating second data from the client device to a second remote device in the second VPN using the particular network prefix. Accordingly, the present method prevents subnet conflicts which otherwise may arise due to attempts to establish VPN tunnels to different distinct subnetworks which use the same particular network prefix.

In one arrangement, the first VPN routing table can include first association data associating a name of the first remote device in the first VPN to the first VPN. Further, the request to connect to the first VPN can include receiving from an application executing on the client device a request to connect to the first remote device in the first VPN. Also, establishing by the client device the first VPN tunnel from the client device to the first VPN can include identifying in the first VPN routing table the first association data associating the name of the first remote device in the first VPN to the first VPN. Accordingly, an application executing on the client device can automatically trigger a VPN tunnel to be established merely by requesting a connection to a remote device.

In a further arrangement, the first VPN can be defined within a third VPN. In such arrangement, a third VPN tunnel can be established from the client device to the third VPN, wherein the client device automatically establishes the third VPN tunnel and the first VPN tunnel in a sequence in which the third VPN tunnel is established prior to establishment of the first VPN tunnel being initiated. Because the first VPN is defined within the third VPN, if the third VPN tunnel is not established prior to the first VPN tunnel, an attempt to establish the first VPN tunnel before is the third VPN tunnel may fail. The present arrangement ensures that the third VPN tunnel is established first, thus preventing such a scenario.

In one arrangement, the method further can include monitoring, by the client device, a quality of service (QoS) measured for communications exchanged between the client device and the first remote device within the first VPN. Responsive to the QoS falling below a threshold level, a third VPN tunnel to the first VPN can be automatically established. Further, data communicated from the client device to the first remote device can be dynamically split among the first VPN tunnel and the third VPN tunnel. Such an arrangement can improve the QoS, for example, by utilizing bandwidth over each of the plurality of the VPN tunnels.

In a further arrangement, data communicated from the first remote device to the client device via the first VPN tunnel and the third VPN tunnel can be dynamically aggregated. Accordingly, the first remote device can communicate data to the client device over each of the plurality of the VPN tunnels, which also can improve QoS.

In one arrangement, the method further can include monitoring, by the client device, a quality of service (QoS) measured for communications exchanged between the client device and the first remote device within the first VPN and, based on the QoS, determining changes to be made to VPN routing parameters in the first VPN routing table to improve the QoS. The changes to the VPN routing parameters in the first VPN routing table can be automatically applied by the client device. Accordingly, the VPN routing parameters can be automatically and dynamically updated to improve QoS as conditions of the network environment change.

In one arrangement, the method further can include, via the first VPN tunnel, the client device accessing, through the first VPN, a service provided by a third remote device in a public communication network outside of the first VPN. Further, a quality of service (QoS) measured for communications exchanged between the client device and the third remote device can be monitored by the client device. Responsive to the QoS falling below a threshold level, a new connection from the client device and the third remote device that does not route through the first VPN can be automatically established. Thus, if conditions of the VPN tunnel degrade, the client device can automatically connect to the remote device without routing through the VPN in order to improve QoS.

Another method includes authenticating a user on a client device. The method includes, responsive to authenticating the user on the client device, automatically retrieving by the client device from a data repository, via a communication network, a virtual private network (VPN) profile assigned to the user, the VPN profile including VPN routing table data generated responsive to the user establishing at least a first VPN tunnel from another client device to a VPN gateway. The method also includes storing the VPN routing table data to a VPN routing table on the client device. The method also includes establishing at least a second VPN tunnel from the client device to the VPN gateway by processing the VPN routing table data generated responsive to the user establishing at least the first VPN tunnel from the other client device to the VPN gateway. Accordingly, a user can share a VPN profile among a plurality of client devices used by the user, without user intervention.

In one arrangement, the client device can monitor a quality of service (QoS) measured for communications exchanged between the client device and a service provided by a remote device within a VPN to which the second VPN tunnel is established and, based on the QoS, determine changes to be made to VPN routing parameters in the VPN routing table to improve the QoS. The client device can automatically apply the changes to the VPN routing parameters in the VPN routing table, applying the changes to the VPN routing parameters in the VPN routing table triggering at least one update to the VPN profile assigned to the user. The client device can communicate, via the communication network, from the client device to the data repository the updated VPN profile assigned to the user, wherein the updated VPN profile assigned to the user is available to be shared with at least the other client device. Accordingly, VPN profiles, including VPN routing parameters, can be seamlessly synchronized among the user's client devices.

A client device includes a processor programmed to initiate executable operations. The executable operations include storing on a client device a respective virtual private network (VPN) routing table for each of a plurality of VPNs. The executable operations also include, responsive to receiving a request to connect to a first VPN of the plurality of VPNs, accessing by the client device a first VPN routing table and, using the first VPN routing table, establishing by the client device a first VPN tunnel from the client device to the first VPN, wherein the first VPN is a first subnetwork that is assigned a particular network prefix. The executable operations also include, while the first VPN tunnel is currently active, responsive to receiving a request to connect to a second VPN of the plurality of VPNs, accessing by the client device a second VPN routing table and, using the second VPN routing table, establishing by the client device a second VPN tunnel from the client device to the second VPN, wherein the second VPN is a second subnetwork that is assigned the same particular network prefix as the first subnetwork. The executable operations also include, while the first VPN tunnel and the second VPN tunnel are simultaneously active, communicating first data from the client device to a first remote device in the first VPN using the particular network prefix, and communicating second data from the client device to a second remote device in the second VPN using the particular network prefix. Accordingly, the present method prevents subnet conflicts which otherwise may arise due to attempts to establish VPN tunnels to different distinct subnetworks which use the same particular network prefix A client device includes a processor programmed to initiate executable operations. The executable operations include authenticating a user on the client device. The executable operations also include, responsive to authenticating the user on the client device, automatically retrieving by the client device from a data repository, via a communication network, a virtual private network (VPN) profile assigned to the user, the VPN profile including VPN routing table data generated responsive to the user establishing at least a first VPN tunnel from another client device to a VPN gateway. The executable operations also include storing the VPN routing table data to a VPN routing table on the client device. The executable operations also include establishing at least a second VPN tunnel from the client device to the VPN gateway by processing the VPN routing table data generated responsive to the user establishing at least the first VPN tunnel from the other client device to the VPN gateway. Accordingly, a user can share a VPN profile among a plurality of client devices used by the user, without user intervention.

A computer program includes a computer readable storage medium having program code stored thereon. The program code is executable by a processor of a client device to perform a method. The method includes storing, by the processor, on a client device a respective virtual private network (VPN) routing table for each of a plurality of VPNs. The method also includes, responsive to receiving a request to connect to a first VPN of the plurality of VPNs, accessing by the client device a first VPN routing table and, using the first VPN routing table, establishing by the client device a first VPN tunnel from the client device to the first VPN, wherein the first VPN is a first subnetwork that is assigned a particular network prefix. The method also includes, while the first VPN tunnel is currently active, responsive to receiving a request to connect to a second VPN of the plurality of VPNs, accessing by the client device a second VPN routing table and, using the second VPN routing table, establishing by the client device a second VPN tunnel from the client device to the second VPN, wherein the second VPN is a second subnetwork that is assigned the same particular network prefix as the first subnetwork. The method also includes, while the first VPN tunnel and the second VPN tunnel are simultaneously active, communicating first data from the client device to a first remote device in the first VPN using the particular network prefix, and communicating second data from the client device to a second remote device in the second VPN using the particular network prefix. Accordingly, the present method prevents subnet conflicts which otherwise may arise due to attempts to establish VPN tunnels to different distinct subnetworks which use the same particular network prefix

BRIEF DESCRIPTION OF THE DRAWINGS

FIG. 5 is a flow chart illustrating an example of a method of maintaining active VPN tunnels to a plurality of subnets which use the same network prefix.

DETAILED DESCRIPTION

Figure 1:
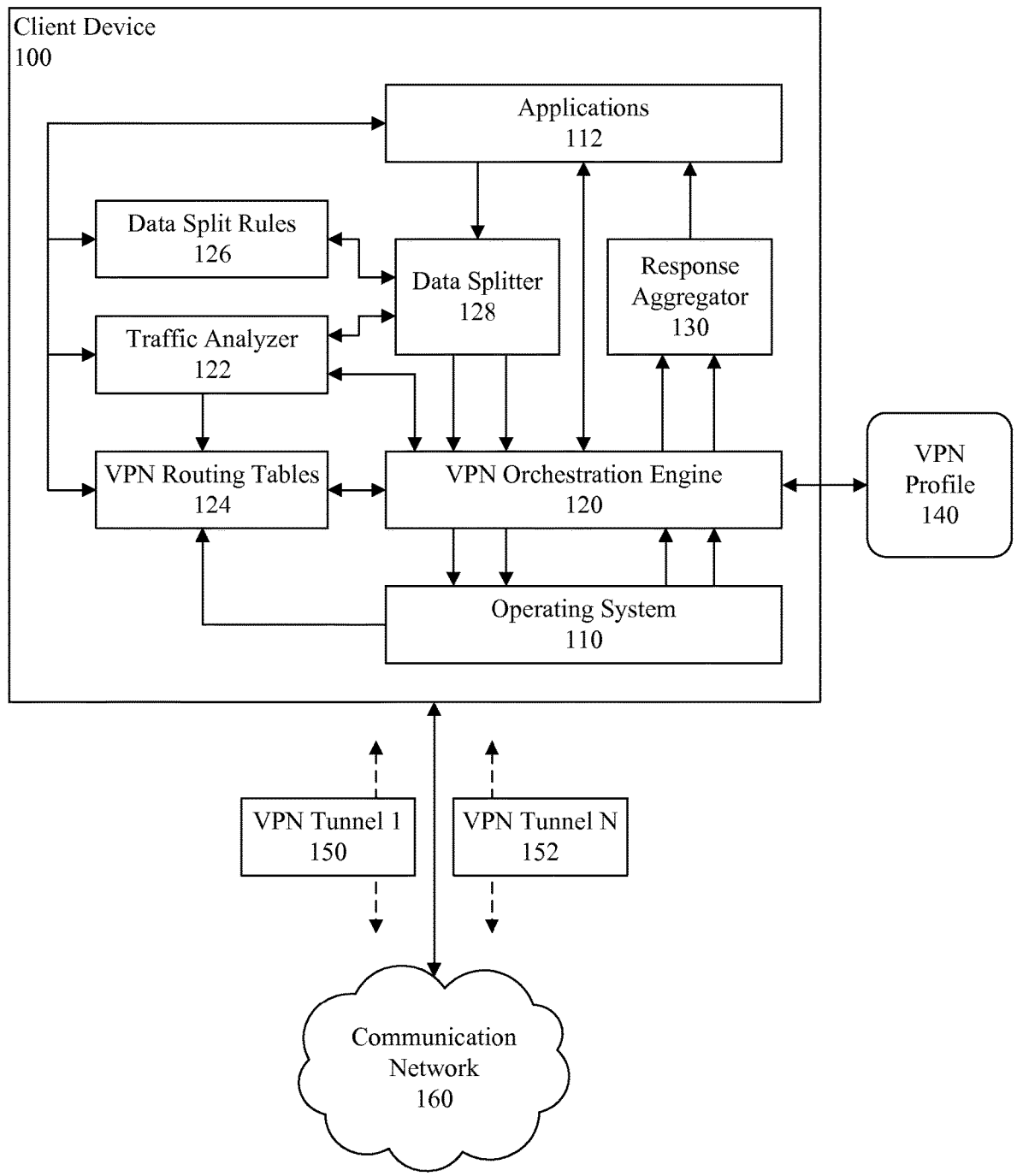
FIG. 1 is a block diagram illustrating an example of a client device configured to communicate via a plurality of simultaneously active VPN tunnels.

This disclosure relates to communication networks, and more specifically, to virtual private networks (VPNs). In accordance with the inventive arrangements disclosed herein, a client device can establish VPN tunnels with a plurality of subnetworks which each use the same network prefix. Thus, rather than being required to disconnect a first VPN tunnel to a first subnetwork in order to establish a second VPN tunnel to a second subnetwork, a client device can have multiple simultaneously active VPN tunnels to subnetworks that share the same network prefix.

Further, a user can use the same VPN profile on multiple client devices. For example, a user may have one or more VPN tunnels connecting to one or more subnetworks using a first client device (e.g., a tablet computer). The user's VPN profile can be automatically stored to a network accessible data repository. At some point, the user can begin using a second client device (e.g., desktop computer). Responsive to the user being authenticated on the second client device, the second client device can automatically retrieve the user's VPN profile to use to establish VPN tunnels to the same subnetworks. In one arrangement, the VPN tunnels can be automatically established responsive to the user authenticating on the second client device, or responsive to the user launching one or more applications that use the VPNs.

Several definitions that apply throughout this document now will be presented.

As defined herein, the term "virtual private network" (referred to herein by the acronym "VPN") means a network that is implemented over a public network, such as the Internet, using at least one VPN protocol to provide a secure network connection to a private network, such as a subnetwork. Communications exchanged in a VPN typically use a common cryptographic key. To a user, a VPN behaves like a dedicated communication line.

As defined herein, the term VPN tunnel means a communication link established with a VPN.

As defined herein, the term "subnetwork" (which may be referred to herein as subnet") means a logical, visible subdivision of an Internet Protocol (IP) network.

As defined herein, the term "network prefix" means the portion of an Internet Protocol (IP) address that identifies a subnetwork. An example of a network prefix is "192.168.5.0" (binary form "11000000.10101000.00000101.00000000"), in which case a device in the subnetwork can be assigned an IP address "192.168.5.n" where "n" is a number (or binary sequence) unique to that device in the subnetwork. For example, the device can be assigned an IP address "192.168.5.130".

As defined herein, the term "client device" means a processing system including at least one processor and memory that requests shared services from a server, and with which a user directly interacts. Examples of a client device include, but are not limited to, a workstation, a desktop computer, a mobile computer, a laptop computer, a netbook computer, a tablet computer, a smart phone, a digital personal assistant, a gaming device, a set-top box, a smart television, and the like. Network infrastructure, such as routers, firewalls, switches, and the like, are not client devices as the term "client device" is defined herein.

As defined herein, the term "remote device" means a device that, with respect to a particular client device, is not a member of a local area network (LAN) in which the particular client device is a member. In this regard, the client device may connect to the remote device via a public communication network (e.g., the Internet) and/or a VPN, but not exclusively through the LAN, although the client device may connect to the public communication network and/or the VPN via the LAN. A remote device may be a member of a LAN in which other client devices are members, but would not be considered a "remote device" with respect to those other client devices.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

FIG. 1 is a block diagram illustrating an example of a client device 100 configured to communicate via a plurality of simultaneously active VPN tunnels 150, 152 via a communication network 160. The communication network 160 may include connections, such as wire, wireless communication links, or fiber optic cables. The communication network 160 can be implemented as, or include, any of a variety of different communication technologies such as a wide area network (WAN), a local area network (LAN), a wireless network, a mobile network, the Internet, the Public Switched Telephone Network (PSTN), or the like.

The client device 100 can include an operating system 110 and a plurality of applications 112 executable by the processor(s) of the client device 100. The client device 100 also can include a VPN orchestration engine 120, a traffic analyzer 122, VPN routing tables 124, data split rules 126, a data splitter 128 and a response aggregator 130.

The VPN orchestration engine 120 can perform orchestration and coordination of data traffic through disparate active VPNs available to the client device 100. The VPN orchestration engine 120 can leverage an optimized VPN management plan provided by the data splitter 128 to implement such orchestration and coordination. Further, the VPN orchestration engine 120 can store an entire context about how VPN tunnels are to be managed for a given VPN profile 140 assigned to the user. Such context can include the VPN routing tables 124 and other pertinent information. Further, the VPN orchestration engine 120 can synchronize the VPN profile 140 with other client devices used by the same user, as will be described. The VPN orchestration engine 120 also can perform other functions which will be described.

The traffic analyzer 122 can monitor the VPN routing tables 124 and monitor the active VPN tunnels 150, 152, which are established by the operating system 110 (or another VPN application executing in the operating system environment). While monitoring the active VPN tunnels 150, 152, the traffic analyzer 122 can monitor quality of service (QoS) parameters associated with each VPN tunnel 150, 152, for example using techniques known in the art. Examples of QoS parameters include, but are not limited to, bandwidth, latency, packet loss, data errors, jitter, out-of-order delivery, and the like. Coordinating with the VPN orchestration engine 120, the traffic analyzer 122 also can implement processes that prevent subnetwork (hereinafter "subnet") conflicts which otherwise may arise due to attempts to establish VPN tunnels 150, 152 to different distinct subnets which use the same particular network prefix, as will be described.

The VPN routing tables 124 can store routing information used by the operating system 110 (or another VPN application) to establish VPN tunnels 150, 152. Each routing table 124 can include, among other parameters, a gateway parameter that indicates a VPN gateway to which a VPN tunnel 150, 152 is to be established and through which network traffic (e.g., data) is communicated. Such network traffic can be represented in a routing table 124 by a network destination parameter and a netmask parameter. Although a conventional VPN routing table is known in the art. The VPN routing tables 124 are enhanced to provide a greater level of VPN functionality and flexibility in comparison to conventional VPN routing tables. The VPN routing tables 124 managed by the operating system 110 (or another VPN application), the traffic analyzer 122 and various applications 112. Moreover, the VPN routing tables 124 can be dynamically updatable, and updated as required by the operating system 110 (or another VPN application), the traffic analyzer 122 and various applications 112. In illustration, for each VPN routing table 124 being used to manage an active VPN tunnel 150, 152, the traffic analyzer 122 can analyze the QoS measured for that VPN tunnel 150, 152. The traffic analyzer 122 can, based on that analysis, determine changes to be made to VPN routing parameters in the VPN routing table 124 to improve the QoS, for example if the QoS indicates a level of VPN tunnel 150 performance that is below a threshold value. The traffic analyzer 122 can automatically apply the changes to the VPN routing parameters in the VPN routing table 124. The traffic analyzer 122 also can update the VPN routing table 124 for the VPN tunnel 152 in a similar manner. To automatically apply the changes to the VPN routing parameters in the VPN routing tables 124, the traffic analyzer 122 can communicate requests including the changes to the operating system 110 (or another VPN application) and/or an application 112 using the VPN tunnel 150, 152 which can, in response, update the VPN routing table 124 with the changes.

In an arrangement in which a plurality of applications 112 executing on the client device each access services provided in a particular VPN, the different applications may have different VPN routing requirements. In illustration, the level of security required by a particular VPN may change, for example based on a type of service being invoked by an application 112 using that VPN. In one arrangement, the application 112 can dynamically update the VPN routing parameters of the VPN's VPN routing table 124 to implement the required level of security. For example, the application 112 may dynamically update the VPN operating parameters to specify a particular level of encryption to be implemented over a VPN tunnel 150, 152, a particular tunneling protocol to be used, etc. In another arrangement, the VPN routing table 124 can be updated based on the VPN profile 140. For example, if the VPN profile 140 indicates a minimum level of security for a particular application 112, and the VPN orchestration engine 120 detects that application 112 being initialized, the VPN orchestration engine 120 can coordinate with the traffic analyzer 122 to update the VPN routing table 124 in accordance with the VPN profile 140.

The data split rules 126 can be policies and rules that specify constraints for splitting data communicated over a plurality of VPN tunnels 150, 152 established over a communication network 160. In one arrangement, the data split rules 126 can implement enterprise level policies, for example those specified by a system with which VPN tunnels 150, 152 are established, or an administrator of such system. In another arrangement, the data split rules can be specified by one or more applications 112. For example, an application 112 can specify rules dictating that certain services invoked by the application 112 be accessed using a particular VPN tunnel 150, and other services invoked by the application 112 be accessed using a different VPN tunnel. The data split rules 126 can be stored to a data table or other suitable data structure on, or otherwise accessible by, the client device 100.

The data splitter 128 can interface with the applications 112 to identify the structure of VPN tunnel requests generated by the applications 112, the services being invoked and the type of data traffic being communicated over the VPN tunnels 150, 152 for the applications 112. The data splitter 128 can access data from the traffic analyzer 122 and data split rules 126 and, based on such data, provide an optimized plan for dynamically splitting the data traffic generated by the applications, and split the data among the plurality of VPN tunnels 150, 152 accordingly. For example, data traffic for a first service invoked by the application 112 can be communicated via the VPN tunnel 150, and data traffic for a second service invoked by the application can be communicated via the VPN tunnel 152, in accordance with the data split rules 126. In another aspect, data traffic communicated from the client device to a particular service can be can be split and communicated among the plurality of VPN tunnels 150, 152 in accordance with the data split rules 126.

In this regard, the application 112 can be aware of the VPN context and be configured to manage control of the VPN connections. For example, the application 112 can dynamically communicate with the data splitter 128 to invoke particular data split rules 126, and can dynamically communicate with the VPN orchestration engine 120 to provide instructions regarding orchestration and coordination of the data traffic across the disparate VPN tunnels 150, 152. The VPN orchestration engine 120 can validate such instructions with the operating system 110. Thus, the application 112 can, in real time, determine which sequence of VPN connections best service its overall needs.

In accordance with the requirements of the Application 112, the data splitter 128 can communicate the split data to the VPN orchestration engine 120, which can determine the context of the data that is split and how the data is split. The VPN orchestration engine 120 can communicate the split data to the operating system 110 (or other VPN application) for communication over a plurality of VPN tunnels 150, 152. During the process of splitting the data, the data splitter 128 can store data split information corresponding to how the data is split. For example, the data splitter 128 can identify a sequence number for each data packet and store each sequence number to a data table or other suitable data structure. For each sequence number the data splitter 128 also can indicate, in the data table or other data structure, the VPN tunnel over which the corresponding data packet is sent.

The response aggregator 130 can aggregate data being received for an application 112 over a plurality of VPN tunnels 150, 152. In illustration, the split data communicated over the plurality of VPN tunnels 150, 152 can include requests (e.g., TCP/UDP requests, HTTP requests, SMP requests, SNMP requests, etc.). Accordingly, responses to those requests can be received by the operating system 110 (or other VPN application) over the plurality of VPN tunnels 150, 152. Each response can indicate the sequence number of a data packet to which the response corresponds. The responses can be communicated to the VPN orchestration engine 120, which can communicate the responses to the response aggregator 130. The response aggregator 130 can access the data split information generated by the data splitter 128 and, based on that information, aggregate the responses into a data stream. The response aggregator 130 can communicate that data stream to the application 112.

By splitting data sent and received by an application 112 over a plurality of VPN tunnels 150, 152, the total bandwidth available for communicating data for that application 112 can be increased in comparison to using a single VPN tunnel 150, 152. Moreover, if the QoS of one VPN tunnel 150, 152 degrades, load balancing can be implemented by the data splitter 128/VPN orchestration engine 120 to communicate a higher volume of data over one or more VPN tunnels 150, 152 having a higher level of QoS. Moreover, if one of the VPN tunnels 150, 152 should happen to become disconnected, data communicated to/from the application 112 can continue uninterrupted.

Various additional examples in accordance with the present arrangements now will be described.

Example 1

Figure 2:
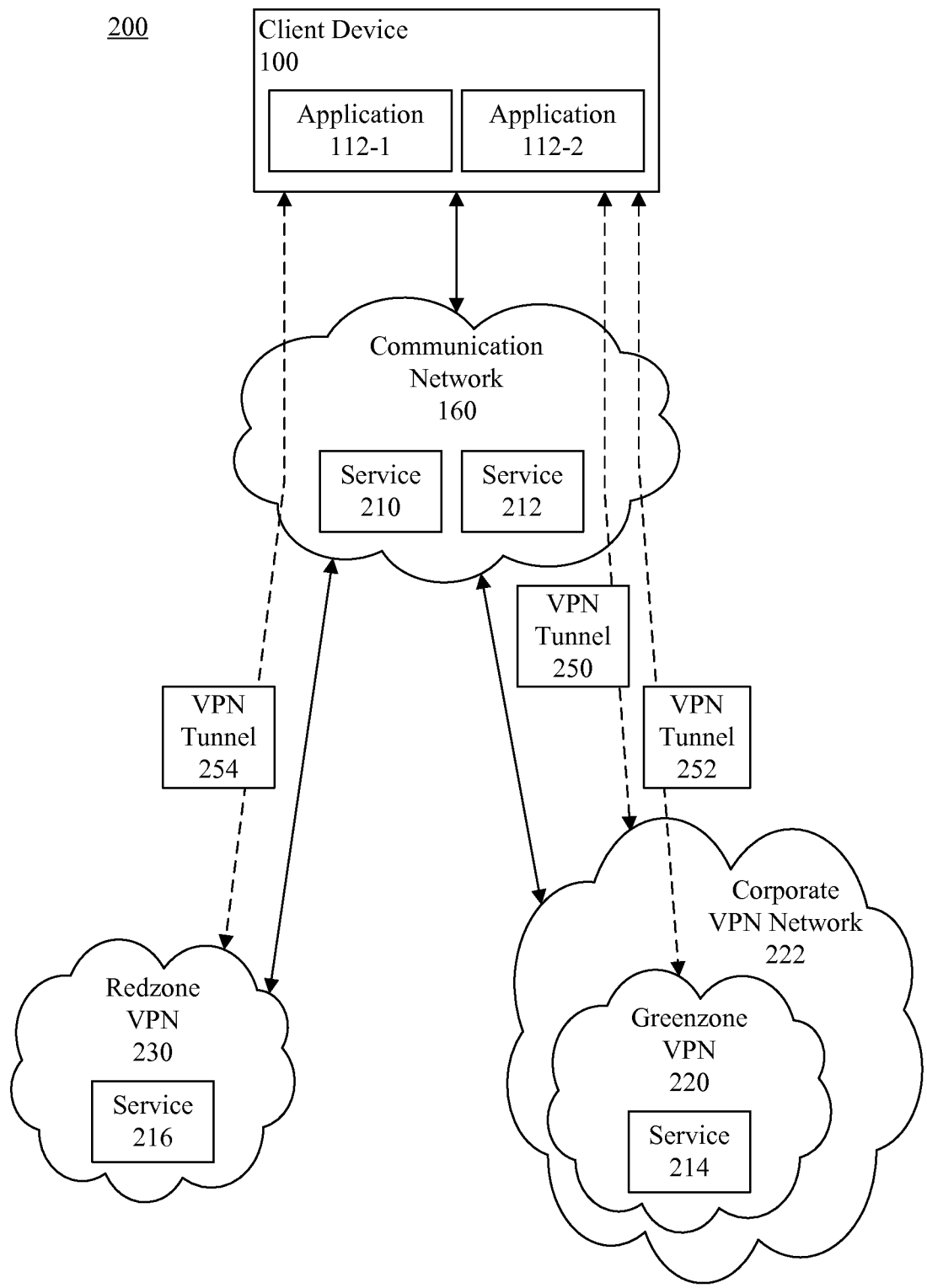
FIG. 2 is a block diagram illustrating an example of a computing environment in which a plurality of active VPN tunnels are established for a client device.

FIG. 2 is a block diagram illustrating an example of a computing environment 200 in which a plurality of active VPN tunnels 250, 252, 254 are established for a client device 100, such as the client device 100 of FIG. 1. In this example, the communication network 160 can be a public communication network via which publically available services 210, 212 may be accessed by the client device 100. The services 210, 212 can be provided by one or more remote devices (i.e., devices that are remote with respect to the client device 100). A service 214 provided by a remote device in a Greenzone VPN 220, which is defined within a corporate VPN network 222, can be available to be accessed by the client device 100. The client device 100 can access the corporate VPN network 222 via a VPN Tunnel 250 established between the client device 100 and a VPN gateway in the corporate VPN network 222. Further, the client device 100 can access the Greenzone VPN 220 via a VPN tunnel 252, which may be established within the VPN tunnel 250. The VPN tunnel 252 can be established between the client device 100 and a VPN gateway within the Greenzone VPN 220. An application 112-1 executing on the client device can invoke the service 214 via the VPN tunnel 252.

A service 216 provided by a Redzone VPN 230 also can be available to be accessed by the client device 100, and the client device 100 can access the Redzone VPN 230 via the VPN tunnel 254 established between the client device 100 and a VPN remote gateway in the a Redzone VPN 230. The application 112-1, or another application 112-2, executing on the client device can invoke the service 216 via the VPN tunnel 254. The VPN orchestration engine 120 can orchestrate (e.g., coordinate) communication of data between the client device 100 and the remote devices hosting the services 214, 216 via the respective VPN tunnels 252, 254.

Although the application 112-1 may access the services 210, 212 via the public communication network, in some instances a higher QoS may be achieved by accessing one or both of the services 210, 212 via the corporate VPN network 222. For example, the corporation may have a service level agreement with the provider of the service 210 that ensures a certain level of QoS to the corporate VPN network 222, and the provider of the service 210 may provide a lower level of QoS to other client devices accessing the service 210 which are not connecting to the service 210 via the corporate VPN network 222. Thus, it may be advantageous for the client device 100 to connect to the corporate network 222 via the VPN tunnel 250, and from the VPN corporate VPN network 222, connect to a remote device hosting the service 210. In this scenario, the application 112-1 can be configured to request the VPN tunnel 250 be established, and use the VPN tunnel 250 to access the service 210 via the corporate VPN network 222. For example, referring to FIGS. 1 and 2, the application 112-1 can communicate with the VPN orchestration engine 120 to access the VPN profile 140, which can indicate a preference to establish a VPN tunnel to the corporate VPN network 222 in order to access the service 210.

As is clear from the above example, the initiation of the VPN tunnels 250-254 can be implemented automatically without any user intervention. Rather than a user initiating processes to establish the VPN tunnels 250-254, which typically is the case in the prior art, the applications 112 requiring use of VPNs 220, 222, 230 can initiate such processes on demand, in real time, when services are to be accessed using the VPN tunnels 250-254. For example, the applications 112 can interface with the VPN orchestration engine 120 to initiate establishment of the VPN tunnels 250-254 by the operating system 110 in accordance with the VPN profile 140. In illustration, an application 112 can indicate a remote device to which a connection is requested.

In response, the VPN orchestration engine 120 can communicate a request to the traffic analyzer 122 to select the appropriate VPN routing table 124 for the VPN in which the remote device is located. The traffic analyzer 122 can select the appropriate VPN routing table 124 by identifying in the VPN routing table 124 contextual data associating the remote device with the VPN corresponding to the VPN routing table 124.

Further, because the VPN tunnel 252 is established within the VPN tunnel 250, the VPN tunnel 250 should be established prior to the VPN tunnel 252 being established. Otherwise, initiation of the VPN tunnel 252 may fail. Thus, a user typically would need to pay close attention to ensure that the VPN tunnels 250, 252 are established in the correct sequence. These processes can get even more complex when several VPN tunnels 250-254 are to be simultaneously active. In accordance with the present arrangements, however, the VPN profile 140 can indicate the sequence in which the VPN tunnels 250, 252 are to be established, and the VPN orchestration engine 120 can automatically establish them in that order. For instance, the VPN orchestration engine 120 can initiate the VPN tunnel 250, and once that VPN tunnel 250 is established, initiate establishment of the VPN tunnel 252. Moreover, when a plurality of applications 112-1, 112-2 are requesting VPN tunnels 250-254, the VPN orchestration engine 120 can communicate with the applications 112-1, 112-2 to orchestrate VPN tunnel 250-254 initiation in a seamless manner.

Example 2

Continuing with the previous example, the traffic analyzer 122 can analyze the QoS measured for communications exchanged between the applications 112 and the various services 210-214 and create an optimized plan for communicating data to the services 210-214. For instance, the traffic analyzer 122 can update the routing table for the corporate VPN network 222 to attempt to maintain a desired level of QoS. The traffic analyzer 122 can do the same for other VPNs.

If the desired level of QoS (e.g., a threshold level of QoS) for communications between the client device 100 and a particular service 210-214 is not maintained, for example due to performance of a VPN gateway degrading, congestion or other adverse conditions encountered in the communication pathway, etc., responsive to the level of QoS falling below the threshold level, the traffic analyzer 122 can communicate an alert to the affected application(s) 112. In one arrangement, in response to the alert, an application 112-1 can request the VPN orchestration engine 120 to initiate processes to establish another VPN tunnel to the corporate VPN network 222, and the application 112-1 can access an affected service 210-214 via the new VPN tunnel. Further, the VPN orchestration engine 120 can communicate a request to the traffic analyzer 122 to update the optimized plan for splitting data across the plurality of VPN tunnels 250, 252, 254. The VPN orchestration engine 120 can coordinate communication of data over the plurality of VPN tunnels 250, 252, 254 in accordance with the optimized plan.

In another arrangement, rather than moving all communication to the new VPN tunnel, the data splitter 128 can split data communicated from the application 112-1 to a service 210-214 among a plurality of VPN tunnels, and the response aggregator 130 can aggregate data received from the service 210-214 over the plurality of VPN tunnels, as previously described. In yet another arrangement, the application 112-1 can establish a new connection to the from the client device 100 to the remote device hosting the service 210 via the public network without routing the connection through the corporate VPN network 222.

Nonetheless, regardless of the type of connection established between the application 112-1 and the service 210, the traffic analyzer 122 can monitor the QoS provided by the connection. If the QoS does not improve, or is worse than the QoS achieved by a previous connection, the application 112-1 can again connect to the service 210 using another connection. In this regard, communications between the applications 112 and services 210-214 can be dynamically orchestrated, in real time, to achieve the highest available QoS.

Example 3

Continuing with the previous examples, the traffic analyzer 122 can persist monitored QoS data to a data storage device on the client device 100, or otherwise accessible by client device 100, along with time/date stamps. The traffic analyzer 122 can analyze the data to determine days and/or times when best QoS is achieved accessing the service 210 via the corporate VPN network 222 and when best QoS is achieved accessing the service via the public network without routing through the corporate VPN network 222. The traffic analyzer 122 can provide results of such analysis to the VPN orchestration engine 120, which can update the VPN profile 140 to indicate days/times when the service 210 should be accessed via the corporate VPN network 222 and when the service 210 should be accessed without routing through the corporate VPN network 222. In this regard, the traffic analyzer 122/VPN orchestration engine 120 can perform machine learning to learn the best way to connect to the service 210 for given days/times, and the results from this machine learning can be implemented by any client devices which use the VPN profile 140 to establish communication links to the service 210. In this regard, the client device 100 can share the VPN profile 140 with other client devices, which will be described.

Example 4

As noted, the traffic analyzer 122 can implement processes that prevent subnet conflicts which otherwise may arise due to attempts to establish VPN tunnels to different distinct subnets which use the same particular network prefix. Typically when such a conflict arises, VPNs cannot be simultaneously active with each of the subnets that use the same network prefix. The traffic analyzer 122, however, can resolve such conflicts and allow the client device 100 to establish VPN tunnels to a plurality of different subnets which each use the same network prefix.

Referring to FIG. 1, the traffic analyzer 122 can access contextual information for each of the applications 112 on the client device 100 which communicate data over at least one VPN tunnel 150, 152. For example, the traffic analyzer 122 can access the contextual information from the VPN profile 140 maintained by the VPN orchestration engine 120 and/or the VPN routing tables 124. The contextual information for each application 112 can indicate the application, an identifier of a VPN gateway for a VPN, and an identifier of a device (e.g., a server) in the VPN to which the application is to connect via a VPN tunnel. The identifier for the device can be a machine name, an IP address assigned to the device, or the like. Further, each VPN can be assigned its own VPN routing table 124.

Referring to FIGS. 1 and 2, responsive to an application 112-2 being launched and/or the application 112-2 requesting a connection to the VPN providing the service 216, the traffic analyzer 122 can access the contextual information for that application 112-2 to identify the VPN to be used (e.g., the Redzone VPN 230) and the VPN routing table 124 for that VPN 230. In one arrangement, the request to connect to the VPN can be inferred based on a request from the application 112-2 to connect to a remote device within the Redzone VPN 230. Responsive to receiving the request to connect to the remote device, the traffic analyzer 122 can identify the appropriate VPN routing table 124 by identifying in the VPN routing table 124 contextual data associating the remote device with the Redzone VPN 230. Accordingly, the VPN orchestration engine 120 can initiate the operating system 110 (or another VPN application) to establish the requested VPN tunnel 254 to the VPN gateway of the Redzone VPN 230 using the corresponding VPN routing table 124. Accordingly, the application 112-1 can communicatively link to remote device in Redzone VPN 230 (e.g., a server providing the service 216) over the VPN tunnel 254.

Responsive to another application 112-1 being launched and/or the application 112-2 requesting another VPN tunnel to connect to another VPN (e.g., the Greenzone VPN 220), the above process can repeat to establish one or more required VPN tunnels 250, 252 in the same manner previously described. Because each VPN tunnel 250, 252, 254 is managed using different VPN routing tables 124, the VPN tunnels 250, 252 254 can be established and can be simultaneously active, even if the Greenzone VPN 220 and Redzone VPN 230 have the same particular subnet prefix. Thus, the client device 100 can communicate data to, and receive data from, remote devices in the Greenzone VPN 220 and Redzone VPN 230 hosting the respective services 214, 216 while the VPN tunnels 250, 252 254 are simultaneously active.

Example 5

Figure 3:
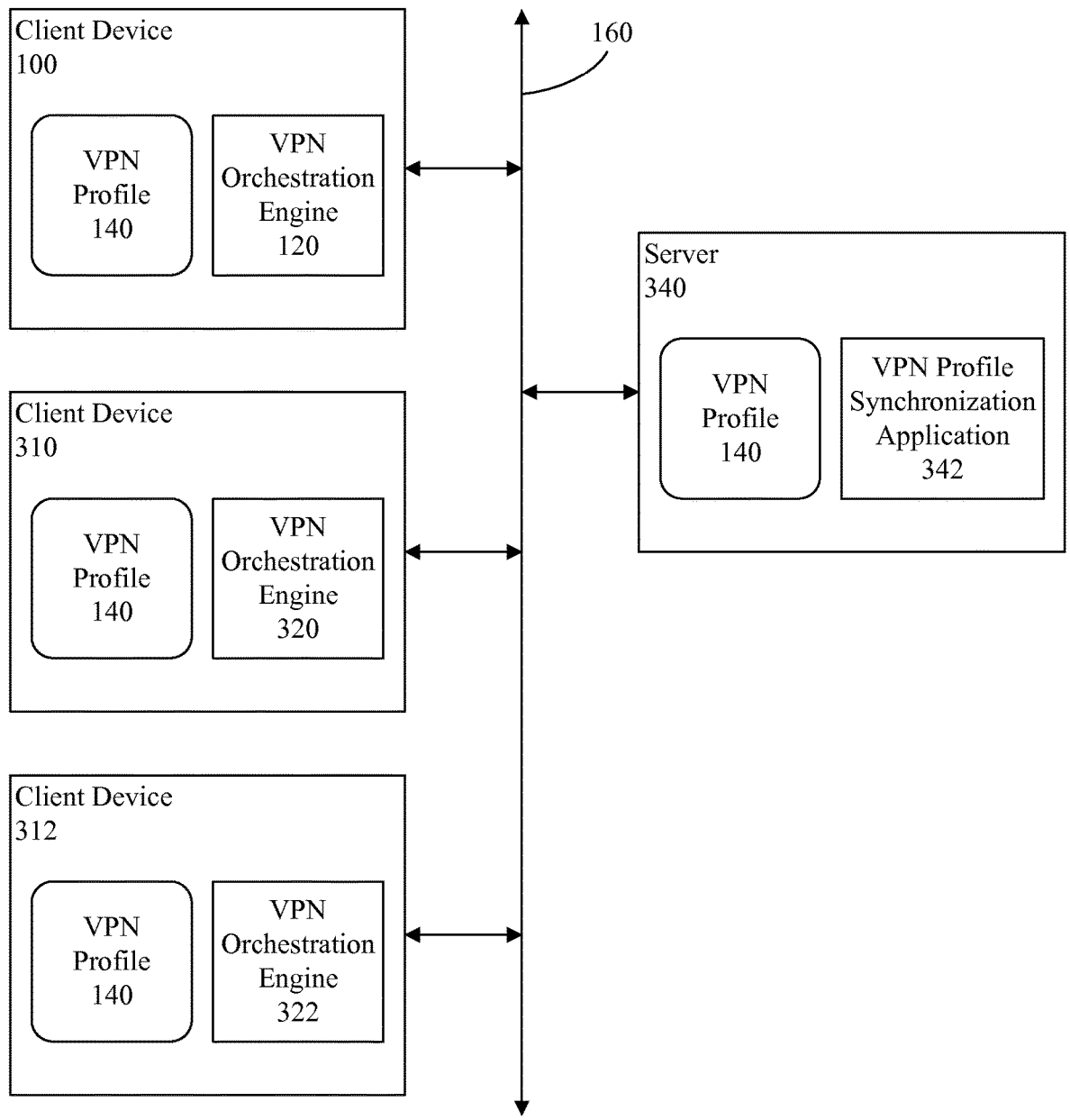
FIG. 3 is a block diagram illustrating an example of a computing environment in which a VPN profile is shared among a plurality of client devices.

FIG. 3 is a block diagram illustrating an example of a computing environment 300 in which a VPN profile 140 is shared among a plurality of client devices 100, 310, 312. The VPN profile 140 can be shared among the plurality of client devices 100, 310, 312 automatically, without user intervention. For example, the user can authenticate with a server 340, or other suitable processing system, configured to store VPN profiles to a suitable computer readable storage medium. In one arrangement, the client device 100 can automatically authenticate the user with the server 340 responsive to the user logging into the client device 100.

Responsive to the user creating or installing a VPN profile 140 on the client device 100, the VPN orchestration engine 120 can communicate, via the communication network 160, the VPN profile 140 to the server 340. The server 340 can store the VPN profile 140 to a data repository on a local computer readable storage medium or to a computer readable storage medium to which the server 340 is communicatively linked. For example, a VPN profile synchronization application 342 can receive and store the VPN profile 140, and associate the VPN profile 140 with a user identifier associated with the user.

At some point the user may begin using another client device, such as the client device 310. Responsive to the user authenticating with the server 340, the VPN profile synchronization application 342 can automatically communicate the VPN profile 140 to a VPN orchestration engine 320 executing on the client device 310, which can store the VPN profile 140 locally on the client device 310. Similarly, responsive to the user authenticating with the server 340 via the client device 312, the VPN profile synchronization application 342 can automatically communicate the VPN profile 140 to a VPN orchestration engine 322 executing on the client device 312, which can store the VPN profile 140 locally on the client device 312. Accordingly, the user can use the same VPN profile 140 on each of the client devices 100, 310, 312. Thus, if the user uses the same application ecosystem on each of the client devices 100, 310, 312, the user need not create individual VPN profiles on each of the client devices, and the applications can seamlessly use that same VPN profile 140.

At some point the VPN profile 140 on one of the client devices 100, 310, 312 may be updated, for example on the client device 100. In illustration, the VPN routing tables 124 (FIG. 1) may be updated based on any number of circumstances, such as those previously described. Responsive to the VPN routing tables 124 being updated, VPN routing data in the VPN profile 140 can be updated. As such, applying changes to the VPN routing tables 124 to the VPN routing tables 124 can automatically trigger one or more changes/updates to the VPN profile 140.

Responsive to the VPN profile 140 being updated, the VPN orchestration engine 320 can prompt the user to indicate whether the user would like the updated VPN profile 140 synchronized with the other client devices 100, 312, or a determination of whether to synchronize the updated VPN profile 140 with the client devices 100, 312 can be based on a user setting. Responsive to the user choosing to synchronize the updated VPN profile 140, or the user setting indicating a user preference to do so, the VPN orchestration engine 320 can communicate an update for the VPN profile 140 to the server 340, and the VPN profile synchronization application 342 can update the VPN profile 140 stored to the data repository accordingly.

Responsive to the user authenticating with the server 340 via the client device 100, the server 340 can communicate the VPN profile update to the VPN orchestration engine 120, which can update the VPN profile 140 stored locally on the client device 100. Moreover, responsive to the VPN profile 140 being updated, the VPN orchestration engine 120 can update the VPN routing tables 124 on the client device 100 with the VPN routing table data contained in the VPN profile 140. The updated VPN profile 140 and VPN routing tables 124 can be used by the VPN orchestration engine 120 and other components of the client device 100 to establish and maintain VPN tunnels with VPN gateways, and coordinate communication of data over the VPN tunnels. A similar process can be performed to update the VPN profile and VPN routing tables stored locally on the client device 312 responsive to the user authenticating with the server 340 via the client device 312.

Accordingly, a user can seamlessly move from using one client device to another, and use the same VPNs one each of the client devices. Moreover, because updates to the VPN routing tables 124 will be implemented across the plurality of devices, each client device will be configured with optimal configurations for communicating data through VPN tunnels. In illustration, if the VPN routing tables 124 are optimized by the client device 100 for present use and/or network conditions, and the user moves to using the client device 310, the VPN routing tables 124 on the client device 310 also will be optimized for present use and/or network conditions.

Figure 4:
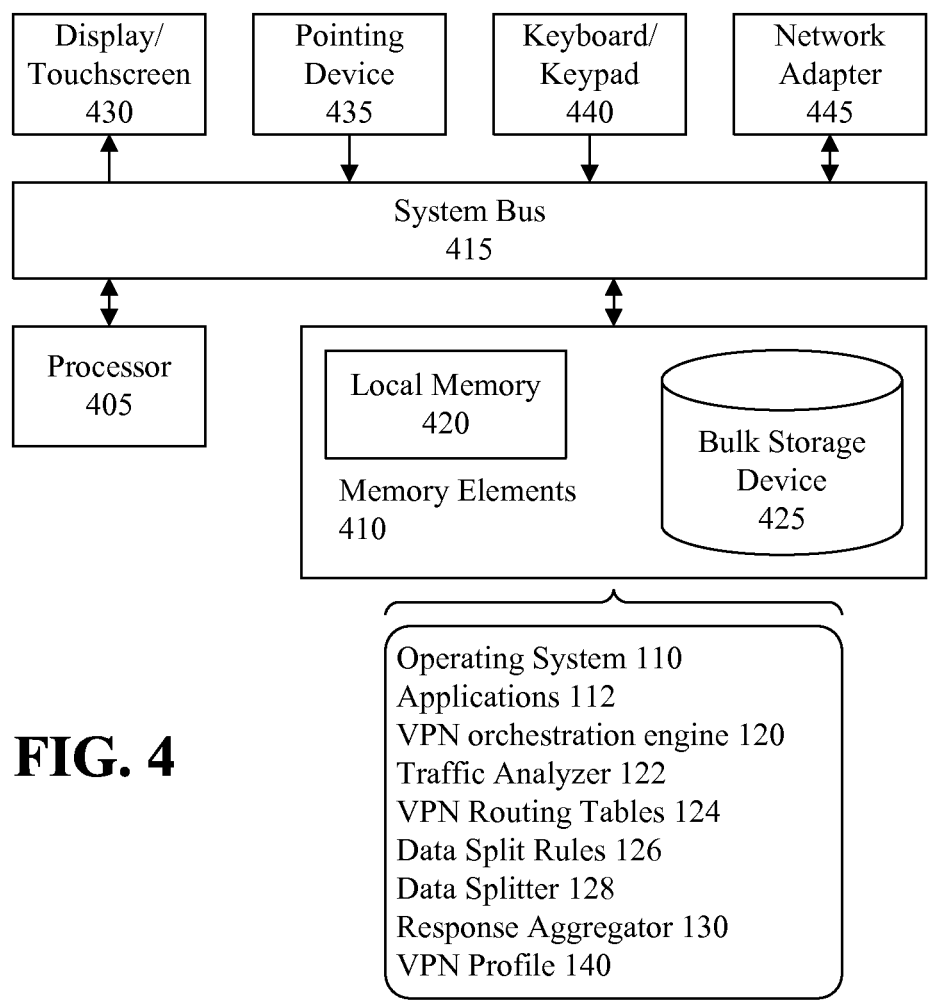
FIG. 4 is a block diagram illustrating example architecture for a client device.

FIG. 4 is a block diagram illustrating an example hardware architecture of the client device 100. The client devices 310, 312 can utilize a similar architecture. The client device 100 can include at least one processor 405 (e.g., a central processing unit) coupled to memory elements 410 through a system bus 415 or other suitable circuitry. As such, the client device 100 can store program code within the memory elements 410. The processor 405 can execute the program code accessed from the memory elements 410 via the system bus 415. It should be appreciated that the client device 100 can be implemented in the form of any system including a processor and memory that is capable of performing the functions and/or operations described within this specification and fit the definition of the term "client device" provided herein.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The client device 100 also can include one or more cache memories (not shown) that provide temporary storage of at least some program code in order to reduce the number of times program code must be retrieved from the bulk storage device 425 during execution.

Input/output (I/O) devices can be coupled to the client device 100. The I/O devices can include a display and/or touchscreen 430. The I/O devices optionally can include a pointing device 435, a keyboard and/or keypad 440 and/or the like. The I/O devices can be coupled to the client device 100 either directly or through intervening I/O controllers. For example, the display/touchscreen 430 can be coupled to the client device 100 via a graphics processing unit (GPU), which may be a component of the processor 405 or a discrete device. One or more network adapters 445 also can be coupled to client device 100 to enable the client device 100 to become coupled to other systems, computer systems, remote printers, and/or remote storage devices through intervening private or public networks. Modems, cable modems, transceivers, and Ethernet cards are examples of different types of network adapters 445 that can be used with the client device 100.

The memory elements 410 can store the components of the client device indicated in FIG. 1, namely the operating system 110, applications 112, VPN orchestration engine 120, traffic analyzer 122, VPN routing tables 124, data split rules 126, data splitter 128 and response aggregator 130. The memory elements 410 also can store the VPN profile 140. Being implemented in the form of executable program code, the operating system 110, applications 112, VPN orchestration engine 120, traffic analyzer 122, data splitter 128 and response aggregator 130 can be executed by the processor 405 of the client device 100 and, as such, can be considered part of the client device 100. Further, the processor 405 also can process the VPN routing tables, the data split rules 126 and the VPN profile 140, and such components also can be considered part of the client device 100. Moreover, the operating system 110, applications 112, VPN orchestration engine 120, traffic analyzer 122, VPN routing tables 124, data split rules 126, data splitter 128, response aggregator 130 and VPN profile 140 are functional data structures that impart functionality when employed as part of the client device 100.

FIG. 5 is a flow chart illustrating an example of a method 500 of maintaining active VPN tunnels to a plurality of subnets which use the same particular network prefix. At step 502, a respective VPN routing table can be stored on a client device for each of a plurality of VPNs. At step 504, responsive to receiving a request to connect to a first VPN of the plurality of VPNs, a first VPN routing table can be accessed by the client device. Using the first VPN routing table, the client device can establish a first VPN tunnel from the client device to the first VPN. The first VPN can be a first subnetwork that is assigned a particular network prefix.

At step 506, while the first VPN tunnel is currently active, responsive to receiving a request to connect to a second VPN of the plurality of VPNs, a second VPN routing table can be accessed by the client device. Using the second VPN routing table, the client device can establish a second VPN tunnel from the client device to the second VPN. The second VPN can be a second subnetwork that is assigned the same particular network prefix as the first subnetwork. At step 508, while the first VPN tunnel and the second VPN tunnel are simultaneously active, first data can be communicated from the client device to a first remote device in the first VPN using the particular network prefix, and second data can be communicated from the client device to a second remote device in the second VPN using the particular network prefix.

Figure 6:
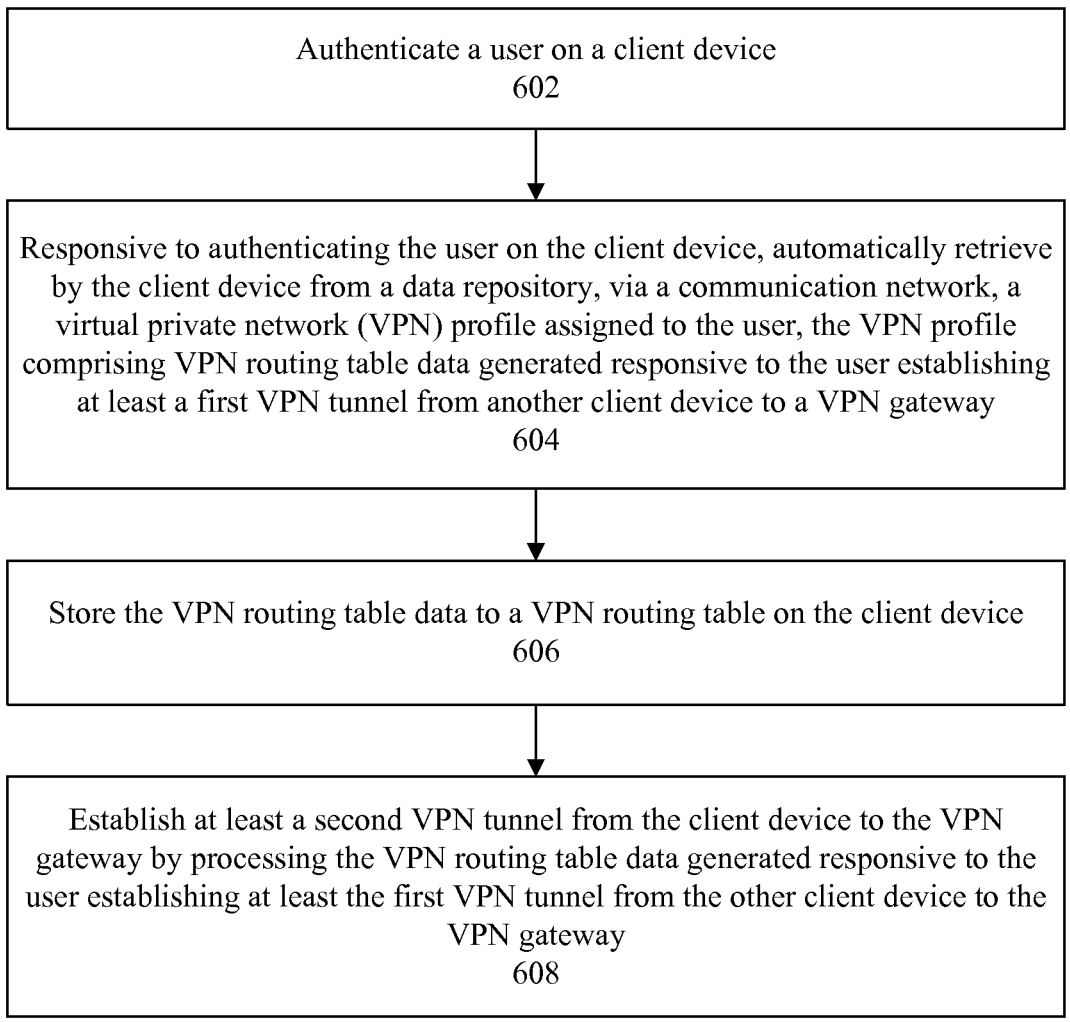
FIG. 6 is a flow chart illustrating an example of a method of sharing a VPN profile across a plurality of client devices.

FIG. 6 is a flow chart illustrating an example of a method 600 of sharing a VPN profile across a plurality of client devices. At step 602, a user can be authenticated on a client device. At step 604, responsive to authenticating the user on the client device, a VPN profile assigned to the user can be automatically retrieved by the client device from a data repository, via a communication network. The VPN profile can comprise VPN routing table data generated responsive to the user establishing at least a first VPN tunnel from another client device to a VPN gateway. At step 606, the VPN routing table data can be stored to a VPN routing table on the client device. At step 608, at least a second VPN tunnel can be established from the client device to the VPN gateway by processing the VPN routing table data generated responsive to the user establishing at least the first VPN tunnel from the other client device to the VPN gateway.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   storing on a client device a respective virtual private network (VPN) routing table for each of a plurality of VPNs;
   responsive to receiving a request to connect to a first VPN of the plurality of VPNs, accessing by the client device a first VPN routing table and, using the first VPN routing table, establishing by the client device a first VPN tunnel from the client device to the first VPN, wherein the first VPN is a first subnetwork that is assigned a particular network prefix, the particular network prefix being a portion of an internet protocol address of the first subnetwork, wherein the portion comprises a first three numbers of the internet protocol address separated by punctuation marks;
   while the first VPN tunnel is currently active, responsive to receiving a request to connect to a second VPN of the plurality of VPNs, accessing by the client device a second VPN routing table and, using the second VPN routing table, establishing by the client device a second VPN tunnel from the client device to the second VPN, wherein the second VPN is a second subnetwork that is assigned the same particular network prefix as the first subnetwork; and
   while the first VPN tunnel and the second VPN tunnel are simultaneously active, communicating first data from the client device to a first remote device in the first VPN using the particular network prefix, and communicating second data from the client device to a second remote device in the second VPN using the particular network prefix.

2. The method of claim 1, wherein:
   the first VPN routing table comprises first association data associating a name of the first remote device in the first VPN to the first VPN;
   receiving the request to connect to the first VPN comprises receiving from an application executing on the client device a request to connect to the first remote device in the first VPN; and
   establishing by the client device the first VPN tunnel from the client device to the first VPN comprises identifying in the first VPN routing table the first association data associating the name of the first remote device in the first VPN to the first VPN.

3. The method of claim 2, wherein the first VPN is defined within a third VPN, the method further comprising:
   establishing by the client device a third VPN tunnel from the client device to the third VPN, wherein the client device automatically establishes the third VPN tunnel and the first VPN tunnel in a sequence in which the third VPN tunnel is established prior to establishment of the first VPN tunnel being initiated.

4. The method of claim 1, further comprising:
   monitoring, by the client device, a quality of service (QoS) measured for communications exchanged between the client device and the first remote device within the first VPN;
   responsive to the QoS falling below a threshold level, automatically establishing a third VPN tunnel to the first VPN; and
   dynamically splitting data communicated from the client device to the first remote device among the first VPN tunnel and the third VPN tunnel.

5. The method of claim 4, further comprising:
   dynamically aggregating, by the client device, data communicated from the first remote device to the client device via the first VPN tunnel and the third VPN tunnel.

6. The method of claim 1, further comprising:
   monitoring, by the client device, a quality of service (QoS) measured for communications exchanged between the client device and the first remote device within the first VPN and, based on the QoS, determining changes to be made to VPN routing parameters in the first VPN routing table to improve the QoS; and
   automatically applying, by the client device, the changes to the VPN routing parameters in the first VPN routing table.

7. The method of claim 1, further comprising:
   via the first VPN tunnel, the client device accessing, through the first VPN, a service provided by a third remote device in a public communication network outside of the first VPN;
   monitoring, by the client device, a quality of service (QoS) measured for communications exchanged between the client device and the third remote device; and responsive to the QoS falling below a threshold level, automatically establishing a new connection from the client device to the third remote device that does not route through the first VPN.

8. A client device, comprising:
   a processor programmed to initiate executable operations comprising:
   storing on the client device a respective virtual private network (VPN) routing table for each of a plurality of VPNs;
   responsive to receiving a request to connect to a first VPN of the plurality of VPNs, accessing by the client device a first VPN routing table and, using the first VPN routing table, establishing by the client device a first VPN tunnel from the client device to the first VPN, wherein the first VPN is a first subnetwork that is assigned a particular network prefix, the particular network prefix being a portion of an internet protocol address of the first subnetwork, wherein the portion comprises a first three numbers of the internet protocol address separated by punctuation marks;
   while the first VPN tunnel is currently active, responsive to receiving a request to connect to a second VPN of the plurality of VPNs, accessing by the client device a second VPN routing table and, using the second VPN routing table, establishing by the client device a second VPN tunnel from the client device to the second VPN, wherein the second VPN is a second subnetwork that is assigned the same particular network prefix as the first subnetwork; and
   while the first VPN tunnel and the second VPN tunnel are simultaneously active, communicating first data from the client device to a first remote device in the first VPN using the particular network prefix, and communicating second data from the client device to a second remote device in the second VPN using the particular network prefix.

9. The client device of claim 8, wherein:
   the first VPN routing table comprises first association data associating a name of the first remote device in the first VPN to the first VPN;
   receiving the request to connect to the first VPN comprises receiving from an application executing on the client device a request to connect to the first remote device in the first VPN; and
   establishing by the client device the first VPN tunnel from the client device to the first VPN comprises identifying in the first VPN routing table the first association data associating the name of the first remote device in the first VPN to the first VPN.

10. The client device of claim 9, wherein the first VPN is defined within a third VPN, the executable operations further comprising:
    establishing by the client device a third VPN tunnel from the client device to the third VPN, wherein the client device automatically establishes the third VPN tunnel and the first VPN tunnel in a sequence in which the third VPN tunnel is established prior to establishment of the first VPN tunnel being initiated.

11. The client device of claim 8, the executable operations further comprising:
    monitoring, by the client device, a quality of service (QoS) measured for communications exchanged between the client device and the first remote device within the first VPN;
    responsive to the QoS falling below a threshold level, automatically establishing a third VPN tunnel to the first VPN; and
    dynamically splitting data communicated from the client device to the first remote device among the first VPN tunnel and the third VPN tunnel.

12. The client device of claim 11, the executable operations further comprising:
    dynamically aggregating, by the client device, data communicated from the first remote device to the client device via the first VPN tunnel and the third VPN tunnel.

13. The client device of claim 8, the executable operations further comprising:
    monitoring, by the client device, a quality of service (QoS) measured for communications exchanged between the client device and the first remote device within the first VPN and, based on the QoS, determining changes to be made to VPN routing parameters in the first VPN routing table to improve the QoS; and
    automatically applying, by the client device, the changes to the VPN routing parameters in the first VPN routing table.

14. The client device of claim 8, the executable operations further comprising:
    via the first VPN tunnel, the client device accessing, through the first VPN, a service provided by a third remote device in a public communication network outside of the first VPN;
    monitoring, by the client device, a quality of service (QoS) measured for communications exchanged between the client device and the third remote device; and
    responsive to the QoS falling below a threshold level, automatically establishing a new connection from the client device to the third remote device that does not route through the first VPN.

15. A computer program product comprising a computer readable storage medium having program code stored thereon, the program code executable by a processor of a client device to perform a method comprising:
    storing, by the processor, on the client device a respective virtual private network (VPN) routing table for each of a plurality of VPNs;
    responsive to receiving a request to connect to a first VPN of the plurality of VPNs, accessing by the client device a first VPN routing table and, using the first VPN routing table, establishing by the client device a first VPN tunnel from the client device to the first VPN, wherein the first VPN is a first subnetwork that is assigned a particular network prefix, the particular network prefix being a portion of an internet protocol address of the first subnetwork, wherein the portion comprises a first three numbers of the internet protocol address separated by punctuation marks;
    while the first VPN tunnel is currently active, responsive to receiving a request to connect to a second VPN of the plurality of VPNs, accessing by the client device a second VPN routing table and, using the second VPN routing table, establishing by the client device a second VPN tunnel from the client device to the second VPN, wherein the second VPN is a second subnetwork that is assigned the same particular network prefix as the first subnetwork; and
    while the first VPN tunnel and the second VPN tunnel are simultaneously active, communicating first data from the client device to a first remote device in the first VPN using the particular network prefix, and communicating second data from the client device to a second remote device in the second VPN using the particular network prefix.

16. The computer program product of claim 15, wherein:
the first VPN routing table comprises first association data associating a name of the first remote device in the first VPN to the first VPN;
receiving the request to connect to the first VPN comprises receiving from an application executing on the client device a request to connect to the first remote device in the first VPN; and
establishing by the client device the first VPN tunnel from the client device to the first VPN comprises identifying in the first VPN routing table the first association data associating the name of the first remote device in the first VPN to the first VPN.

17. The computer program product of claim 16, wherein the first VPN is defined within a third VPN, the method further comprising:
establishing by the client device a third VPN tunnel from the client device to the third VPN, wherein the client device automatically establishes the third VPN tunnel and the first VPN tunnel in a sequence in which the third VPN tunnel is established prior to establishment of the first VPN tunnel being initiated.

18. The computer program product of claim 15, the method further comprising:
monitoring, by the client device, a quality of service (QoS) measured for communications exchanged between the client device and the first remote device within the first VPN;
responsive to the QoS falling below a threshold level, automatically establishing a third VPN tunnel to the first VPN; and
dynamically splitting data communicated from the client device to the first remote device among the first VPN tunnel and the third VPN tunnel.

19. The computer program product of claim 18, the method further comprising:
dynamically aggregating, by the client device, data communicated from the first remote device to the client device via the first VPN tunnel and the third VPN tunnel.

20. The computer program product of claim 15, the method further comprising:
monitoring, by the client device, a quality of service (QoS) measured for communications exchanged between the client device and the first remote device within the first VPN and, based on the QoS, determining changes to be made to VPN routing parameters in the first VPN routing table to improve the QoS; and
automatically applying, by the client device, the changes to the VPN routing parameters in the first VPN routing table.

21. The computer program product of claim 15, the method further comprising:
via the first VPN tunnel, the client device accessing, through the first VPN, a service provided by a third remote device in a public communication network outside of the first VPN;
monitoring, by the client device, a quality of service (QoS) measured for communications exchanged between the client device and the third remote device; and
responsive to the QoS falling below a threshold level, automatically establishing a new connection from the client device to the third remote device that does not route through the first VPN.

* * * * *